United States Patent [19]

Reed

[11] Patent Number: 4,695,161

[45] Date of Patent: Sep. 22, 1987

[54] AUTOMATIC RANGING GUN SIGHT

[75] Inventor: Larry T. Reed, Richardson, Tex.

[73] Assignee: Axia Incorporated, Oak Brook, Ill.

[21] Appl. No.: 637,721

[22] Filed: Aug. 6, 1984

[51] Int. Cl.[4] ............................................. G02B 27/36
[52] U.S. Cl. ..................................... 356/254; 356/255
[58] Field of Search ............... 356/247, 252, 253, 254, 356/255

[56] References Cited

U.S. PATENT DOCUMENTS

| 3,464,770 | 9/1969 | Schmidt | 356/252 X |
| 3,885,861 | 5/1975 | Farnsworth et al. | 356/252 X |
| 4,404,890 | 9/1983 | McAlpine | 356/252 X |

*Primary Examiner*—Vincent P. McGraw
*Attorney, Agent, or Firm*—Richards, Harris, Medlock & Andrews

[57] ABSTRACT

An auto-ranging sight includes an optical viewer that includes a reticle within the viewer. The reticle is a liquid crystal display having a plurality of horizontal lines which can individually be selected to be visible. A distance measuring device is provided for measuring distance from the sight to a target. Parameter information is input to a microprocessor to describe the flight of a projectile. The microprocessor also receives the distance information. The microprocessor then determines the required elevation for the optical viewer and attached weapon. It then selects one of the horizontal lines as the visible horizontal cross-hair. The operator then aligns the horizontal and vertical cross-hairs seen through the viewer such that the projectile can be accurately directed to the target. Optionally, a group of liquid crystal display vertical lines can be provided to accommodate windage adjustment for aiming the target. The range determination can be provided by systems using radar, laser, ultrasonic or infrared signals.

2 Claims, 6 Drawing Figures

AUTOMATIC RANGING GUN SIGHT

TECHNICAL FIELD

The present invention pertains to a targeting apparatus for a weapon and in particular to a rifle sight which provides automatic compensation for range.

BACKGROUND OF THE INVENTION

A weapon such as a rifle is typically aimed at long distances by use of a telescopic sight. Such a sight includes horizontal and vertical cross-hairs to provide aiming of the rifle toward the target. It is well known that if the target is located at greater distances from the rifle, the rifle angle above horizontal must be increased to compensate for the vertical drop by the projectile during its flight from the rifle to the target. There have been numerous techniques proposed for adjusting rifle elevation as a function of the distance to the target. Such techniques are shown, for example, in U.S. Pat. Nos. 42,983, 3,340,614, 3,92,450, 3,492,733, 3,588,250, 4,212,109, 4,263,719, and 4,403,421. However, these various techniques are not fully successful in providing rapid, accurate and automatic elevation compensation for the aiming of a rifle toward a target.

In view of the difficulty of providing range compensation for a rifle and the numerous problems involving prior mechanical methods, there exists a need for a nonmechanical, fast, accurate and reliable technique for providing range compensation.

SUMMARY OF THE INVENTION

A selected embodiment of the present invention comprises an automatic ranging sight for a weapon which fires a projectile. The sight includes means for determining the distance from the weapon to a target. An optical viewer is mounted on the weapon for viewing the target. A reticle within the viewer provides horizontal cross-hair positions which are selectable over a vertical range. Electronic circuitry is provided for selecting one of the horizontal cross-hair positions as a function of the distance to the target and a parameter associated with the travel of the projectile whereby the selected cross-hair position provides elevation aiming to the target for the weapon.

BRIEF DESCRIPTION OF THE DRAWINGS

For more complete understanding of the present invention and the advantages thereof, reference is now made to the following description taken in conjunction with the accompanying drawings in which.

DETAILED DESCRIPTION OF THE INVENTION

Figure 1:
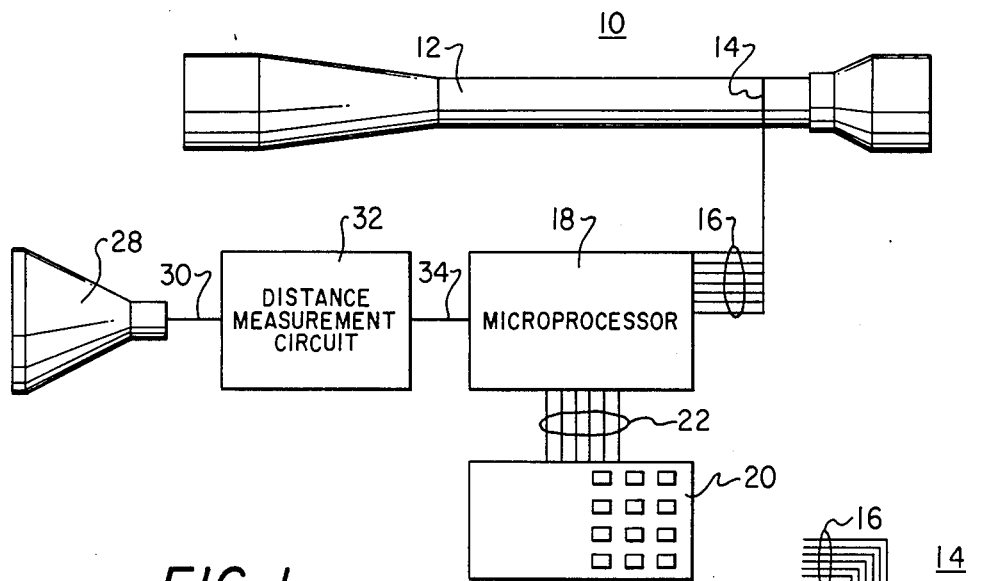
FIG. 1 is a schematic diagram for the automatic ranging sight of the present invention.

Referring now to FIG. 1 there is illustrated a functional diagram for one embodiment of the present invention. The auto-ranging system shown in FIG. 1 is generally referred to by the reference numeral 10. The system 10 can be mounted on a weapon (not shown) such as a rifle. The weapon fires projectiles at a selected target. The system 10 includes an optical viewing scope 12 which is essentially aligned with the bore of the weapon. The operator of the weapon views the target through the scope 12. The scope 12 further includes a reticle 14 which is further described in reference to FIGS. 2 and 3. The reticle 14 is electrically activated through a group of lines 16.

A microprocessor 18 generates control signals which are transmitted through the lines 16 to the reticle 14. A keyboard 20 is connected through lines 22 for providing control information to the microprocessor 18.

A radar horn 28 transmits and receives radar pulses which are reflected from a target. The radar range information is transmitted through a line 30 to a distance measuring circuit 32. The circuit 32 determines the distance from the system 10 to the target which reflects the radar pulses. The distance information to the target is transmitted through a line 34 to the microprocessor 18.

Figure 2:
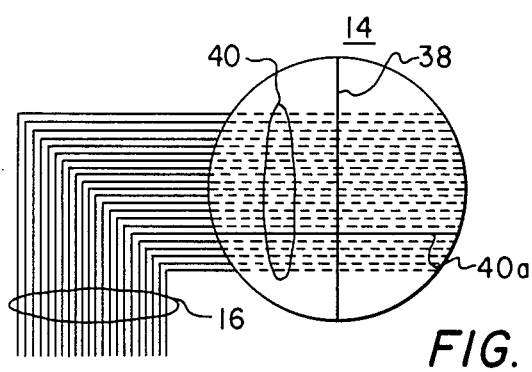
FIG. 2 is an illustration of a reticle having a plurality of liquid crystal display horizontal lines which serve as horizontal cross-hairs.

The reticle 14 is shown in FIG. 2. The reticle 14 is preferably a liquid crystal display (LCD). The reticle 14 includes a fixed vertical line 38 which serves as a vertical cross-hair. The line 38 is visible at all times. The reticle 14 further includes a plurality of horizontal lines 40, each of which consists of a thin strip extending across the reticle. Each of the lines 40 can be selectively activated while the non-activated lines are essentially invisible. In FIG. 2 a line 40a is shown activated. The lines 40 are selectively activated in response to commands received from the microprocessor 18 (shown in FIG. 1) through lines 16 which are connected respectively to the lines 40.

Figure 3:
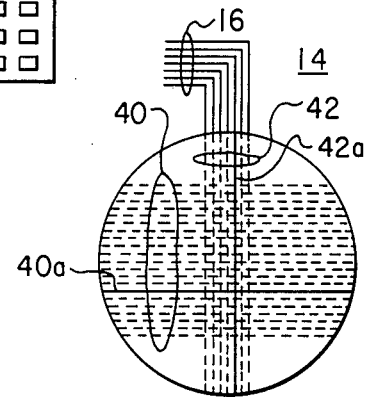
FIG. 3 is an illustration of a reticle having a plurality of vertical liquid crystal display lines which serve as selectable vertical cross-hairs in addition to the horizontal cross-hairs.

Referring now to FIG. 3 there is illustrated an additional feature which can be used in conjunction with the present invention. FIG. 3 shows a variation of the reticle 14 which further includes a group of liquid crystal lines 42 which represent vertical cross-hairs. The vertical lines 42 are also connected to the lines 16 from microprocessor 18 (shown in FIG 1). The optional vertical lines 42 provide a windage compensation for targeting the system 10. The lines 42, like the lines 40, are essentially transparent except when a selected one of the lines, such as 42a, is activated.

Figure 4:
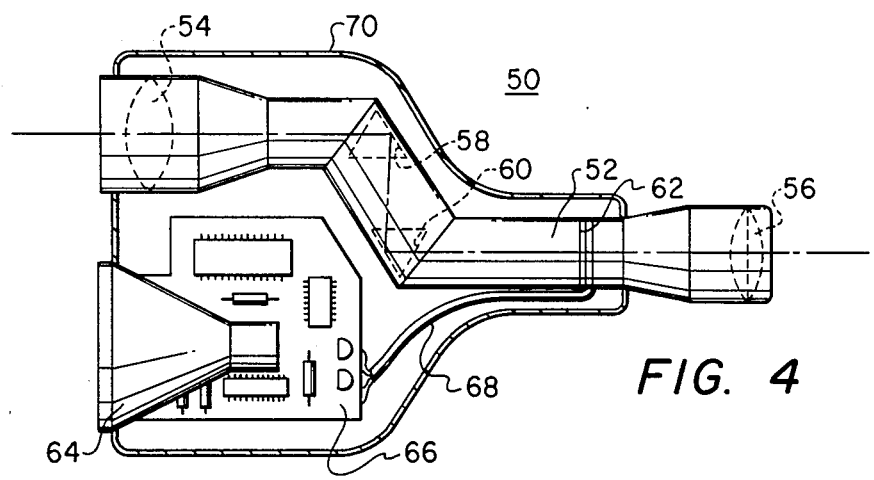
FIG. 4 is a cut-away plan view of an automatic ranging sight in accordance with the present invention.

Referring now to FIG. 4 there is illustrated a plan view for a further embodiment of the present invention. The embodiment shown in FIG. 4 is generally described by the reference numeral 50. System 50 is an integral unit which can be mounted on many types of weapons, typically rifles, in the same manner as a conventional telescopic sight. The system 50 includes a scope 52 having lenses 54 and 56 and prisms 58 and 60. The scope 52 further includes a reticle 62 which corresponds to the reticle 14 previously described. A radar horn 64 is connected to a circuit board 66 which has circuitry mounted thereon to provide distance measuring for radar pulses transmitted and received by horn 64. The circuit board 66 is connected through a cable 68 to the reticle 62. The scope 52, horn 64, circuit board 66 and cable 68 are included in a housing 70.

Figure 5:
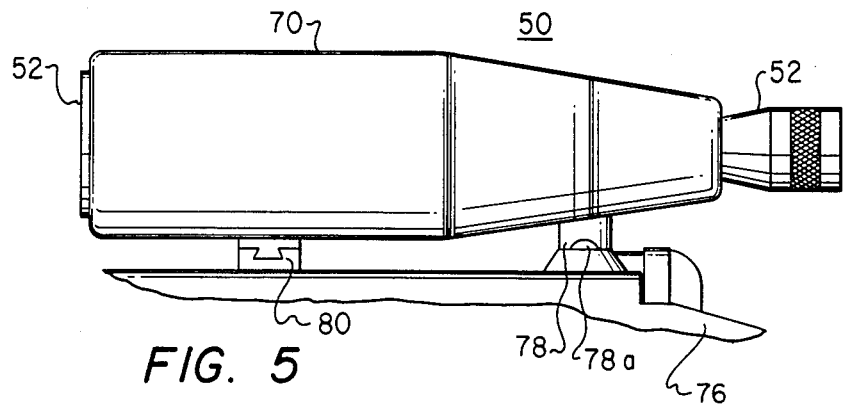
FIG. 5 is an elevation view of the sight shown in FIG. 4.
Figure 6:
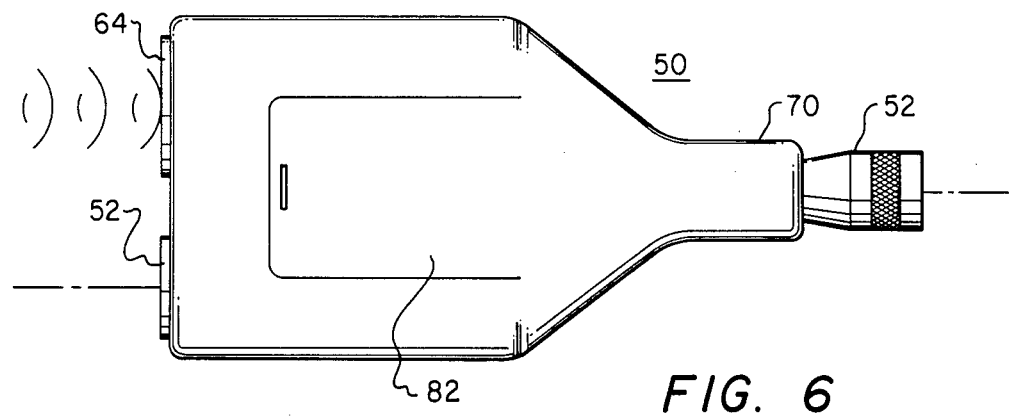
FIG. 6 is a plan view of the sight shown in FIG. 4.

Referring now to FIGS. 5 and 6, there are illustrated elevation and plan views of the system 50 as it is mounted on a rifle 76. The system 50 is connected to rifle 76 through adjustable mounts 78 and 80. Mount 78 includes an adjustment screw 78a for providing vertical adjustment of the system 50 relative to the rifle 76. The adjustable mount 80 includes a horizontal track for providing horizontal movement of the system 50 relative to the rifle 76. The mounts 78 and 80 provide basic alignment and aiming of the system 50 with respect to the rifle 76.

In FIG. 6 there is further shown a cover 82 which provides access to within the housing 70. By opening the cover 82 the operator has access to the keyboard 20 (shown in FIG. 1) for entering required information. There is further shown in FIG. 6 the radar pulses that are transmitted and received by horn 64 and the line of sight for the scope 52.

Operation of the auto-ranging sight of the present invention is now described in reference to the figures. It is well known that a projectile fired by a rifle is accelerated by gravity to fall toward the earth rather than travelling in a perfectly straight path. This is often referred to as the drop of the projectile. The drop increases at greater distances from the rifle. Compensation for the drop is provided by elevating the angle of the bore of the rifle to provide a vertical velocity component for the projectile to offset the drop. However, the amount of the elevation angle is a function of the distance from the rifle to the target.

In the present invention the selected elevation is provided by activating one of a plurality of horizontal cross-hairs within the lines 40 of the reticle 14. The selected cross-hair is determined by the microprocessor 18. The determination of the selected horizontal cross-hair is a function of the distance from the system 10 to the target and the flight path of the projectile. The most significant element of the projectile flight path is its velocity. Higher velocity projectiles have a lesser drop for a given distance than do lower velocity projectiles. The velocity of a projectile which is used with the system 10 is enter via the keyboard 20 into the microprocessor 18. Other information, such as air resistance of the projectile, can also be entered into the microprocessor 18 if such information is significant for the targeting of the projectile. Other relative information can be the type and condition of the particular weapon being used with the projectile.

The microprocessor 18 utilizes the distance measurement provided by the circuit 32 together with the parameter information describing the flight of the projectile. Based upon this information the microprocessor 18 selects one of the horizontal cross-hairs in the lines 40 to provide the desired elevation for the weapon which is aimed by the system 10. The operator then aligns the desired target within the vertical and horizontal cross-hairs so that the projectile can be directed accurately to the target.

As an optional feature the reticle 14 can be provided with windage compensation as illustrated in FIG. 3. The windage compensation can be entered via the keyboard 20 as with the projectile parameters or it may be entered manually with an external switch (not shown) which is connected to the vertical lines 42. As a further option, the windage information can be input automatically by a wind sensor system (not shown). Thus, the operator of the weapon can be provided automatically with the necessary targeting information for aiming the weapon such that there is a high probability that the projectile will strike the target.

In an optional embodiment the radar horn 28, and associated radar system, can be replaced with a laser range finder such as shown in U.S. Pat. No. 3,533,696. The laser range finder provides the distance measuring function just as described for the radar system above.

Further, other types of distance measuring devices (DMD) can be used such as ultrasonic and infrared.

Application of the present invention is not limited to a hand-held weapon, such as a rifle. It can also be utilized in the targeting of a heavy weapon, such as the main gun of a tank.

Although one embodiment of the invention has been illustrated in the accompanying drawings and described in the foregoing Detailed Description, it will be understood that the invention is not limited to the embodiment disclosed but is capable of numerous rearrangements, modifications and substitutions of parts and elements without departing from the scope of the invention.

What I claim is:

1. An automatic ranging sight for a weapon which fires a projectile, comprising:
    a housing supported on the weapon, the housing defining a plane of symmetry generally parallel the direction of projectile motion,
    means for determining the distance from said weapon to a target mounted within said housing generally on a first side of said plane of symmetry,
    an optical viewer mounted in said housing, said optical viewer having an optical path on the second side of the plane of symmetry at the end of the housing facing the target, the optical path being altered through a pair of prisms to lie on the plane of symmetry near the end of the housing away from the target for viewing by the weapon operator,
    a reticle in said viewer, said reticle comprising a liquid crystal display having a plurality of horizontal cross-hair which are essentially transparent except for a cross-hair at a selected position over the vertical range of horizontal cross-hair positions, and
    means for selecting one of said horizontal cross-hair positions as a function of the distance to said target as determined by said distance determining means whereby the selected cross-hair position provides elevation aiming to said target for said weapon while the optica path is uninterrupted by said distance determining means.

2. An automatic ranging sight as recited in claim 1 further comprising means mounted in said housing for operator entry of the velocity of the projectile, said input velocity used by said selecting means to provide elevation aiming to said target for said weapon based on the projectile velocity.

* * * * *